(12) United States Patent
Granz et al.

(10) Patent No.: US 11,670,337 B1
(45) Date of Patent: Jun. 6, 2023

(54) DISCRETE TRACK MAGNETIC RECORDING FOR EAMR

(71) Applicant: Seagate Technology LLC, Fremont, CA (US)

(72) Inventors: Steven Douglas Granz, Shakopee, MN (US); Ian James Gilbert, Chanhassen, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/540,566

(22) Filed: Dec. 2, 2021

(51) Int. Cl.
*G11B 20/12* (2006.01)
*G11B 21/08* (2006.01)

(52) U.S. Cl.
CPC .................................. *G11B 21/08* (2013.01)

(58) Field of Classification Search
CPC ..... G11B 21/08; G11B 5/012; G11B 2220/20; G11B 5/02; G11B 27/36; G11B 20/18; G11B 5/6005; G11B 5/59633; G11B 2220/90; G11B 5/59688; G11B 5/59638; G11B 2005/0021; G11B 20/12
USPC .......................................................... 360/59
See application file for complete search history.

(56) References Cited

U.S. PATENT DOCUMENTS

| | | | |
|---|---|---|---|
| 6,139,936 A | 10/2000 | Weiss | |
| 6,775,100 B1 | 8/2004 | Belser et al. | |
| 7,998,661 B2 | 8/2011 | Kim et al. | |
| 8,031,561 B2 * | 10/2011 | Hellwig | G11B 5/3133 369/13.01 |
| 8,743,497 B2 | 6/2014 | Gao et al. | |
| 9,472,223 B1 * | 10/2016 | Mendonsa | G11B 20/1816 |
| 10,037,779 B1 * | 7/2018 | Mendonsa | G11B 21/08 |
| 10,109,309 B1 | 10/2018 | Jubert et al. | |
| 2004/0101713 A1 | 5/2004 | Wachenschwanz et al. | |
| 2006/0002017 A1 | 1/2006 | Taguchi et al. | |
| 2006/0121318 A1 | 6/2006 | Gage et al. | |
| 2011/0043941 A1 * | 2/2011 | Champion | G11B 5/7375 360/59 |
| 2013/0003511 A1 * | 1/2013 | Gao | G11B 5/314 369/13.13 |
| 2016/0118071 A1 * | 4/2016 | Hirotsune | G11B 5/3133 360/75 |

OTHER PUBLICATIONS

D. Weller, et al., "Review Article: FePt heat assisted magnetic recording media," Journal of Vaccuum Science and Technology, B 34, 060801, https://doi.org/10.1116/1.4965980, dated Nov. 29, 2016, 11 pages.

(Continued)

*Primary Examiner* — Nabil Z Hindi
(74) *Attorney, Agent, or Firm* — Westman, Champlin & Koehler, P.A.

(57) ABSTRACT

A data storage medium includes a substrate, and a plurality of spaced-apart discrete data storage tracks supported by the substrate. The data storage medium also includes magnetic flux sinking material between the discrete data storage tracks and over the substrate. As an alternative to the magnetic flux sinking material, plasmonic material may be included between the discrete data storage tracks and over the substrate.

19 Claims, 5 Drawing Sheets

(56) References Cited

OTHER PUBLICATIONS

T. Klemmer et al., "Magnetic Hardening and Coercivity Mechanisms in L1 Ordered FePd Ferromagnets," Department of Materials Science and Engineering, vol. 33, Nos. 10/11, pp. 1793-1805, dated Apr. 27, 1995, 13 pages.

D. Weller et al., "High Ku Materials Approach to 100 Gbits/in2," IEEE Transactions on Magnets, vol. 36, No. 1, dated Jan. 2000, 6 pages.

M. G. Blaber et al., "A review of the optical properties of alloys and intermetallics for plasmonics," Journal of Physics: Condensed Matter, vol. 22, No. 14, dated Mar. 25, 2010, 26 pages.

Bozorth et al., "Ferromagnetism," IEEE Press, Appendix 4, p. 870, 871, dated 1978, 1 page.

\* cited by examiner

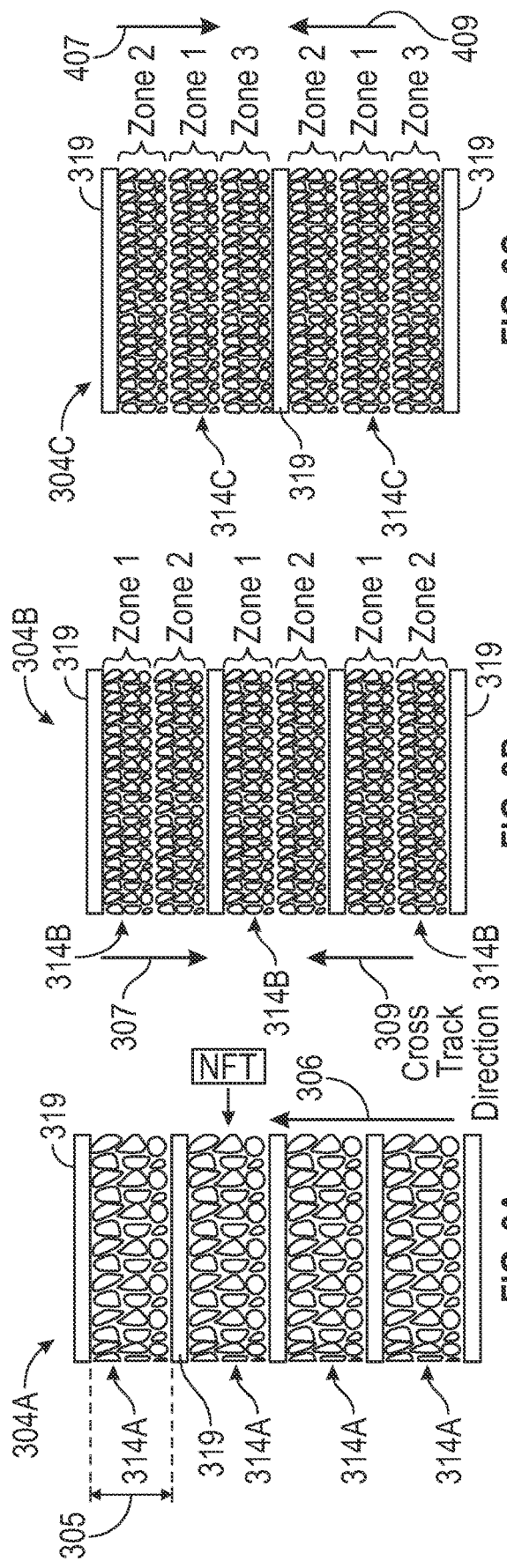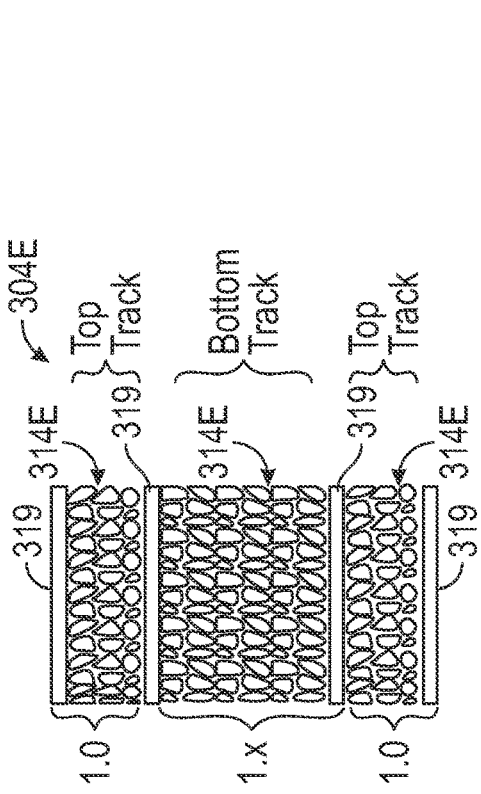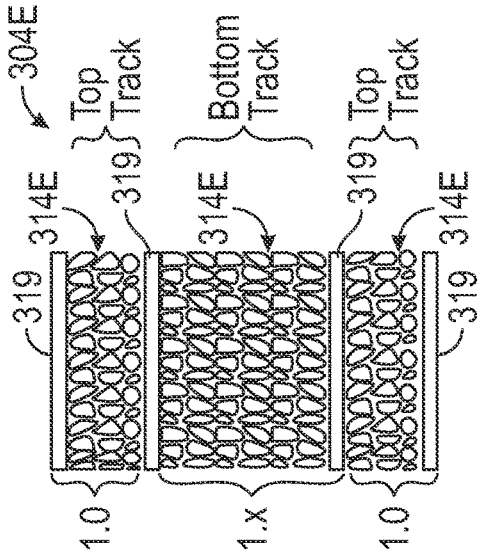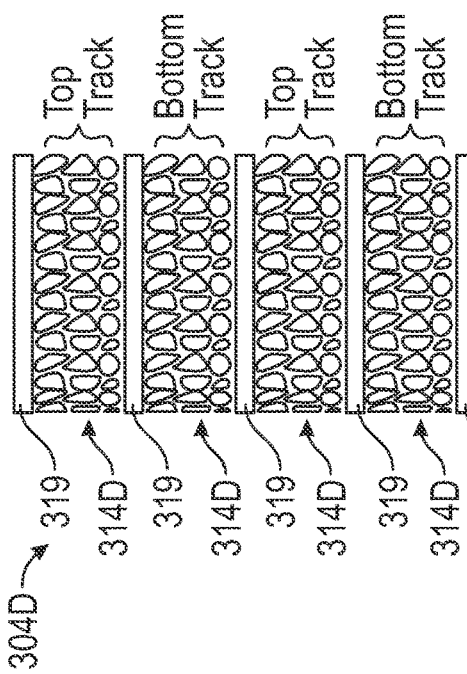
FIG. 3A, FIG. 3B, FIG. 3C, FIG. 3D, FIG. 3E

DISCRETE TRACK MAGNETIC RECORDING FOR EAMR

SUMMARY

In one embodiment, a data storage medium is provided. The data storage medium includes a substrate, and a plurality of spaced-apart discrete data storage tracks supported by the substrate. The data storage medium also includes magnetic flux sinking or plasmonic material between the discrete data storage tracks and over the substrate.

In another embodiment, a data storage drive is provided. The data storage drive includes a data storage medium that has a substrate, and a plurality of spaced-apart discrete data storage tracks supported by the substrate. The data storage drive also includes at least one recording head configured to interact with the data storage medium. The data storage drive further incudes control circuitry communicatively coupled to the at least one recording head. The control circuitry is configured to direct the at least one recording head to write multiple zones of data within at least one discrete data storage track of the plurality of spaced-apart discrete data storage tracks. Each of the multiple zones of data forms a different magnetically defined data storage track within the at least one discrete data storage track.

In yet another embodiment, a data storage medium is provided. The data storage medium includes a substrate and a plurality of spaced-apart discrete data storage tracks supported by the substrate. The plurality of spaced-apart discrete data storage tracks includes a first discrete data storage track having a first track pitch, and a second discrete data storage track having a second track pitch that is greater than the first track pitch.

Other features and benefits that characterize embodiments of the disclosure will be apparent upon reading the following detailed description and review of the associated drawings.

BRIEF DESCRIPTION OF THE DRAWINGS

FIGS. 3A-3E include top views of DTMR disc portions in accordance with different embodiments.

DETAILED DESCRIPTION of ILLUSTRATIVE EMBODIMENTS

Embodiments of the disclosure relate to the use of discrete track magnetic recording (DTMR) in energy-assisted magnetic recording (EAMR) applications. EAMR involves focusing energy at a spot on a data storage medium track being written to make the data storage medium easier to write in that spot. Examples of EAMR include heat-assisted magnetic recording (HAMR) and microwave-assisted magnetic recording (MAMR).

As HAMR continues to increase in areal density, a width of a near-field transducer (NFT) used to heat media before writing may be required to continue to scale with reductions in track pitch or track width. In the future, the NFT width will no longer properly scale, and patterned features in the media may be needed to define the track pitch of the HAMR system. Accordingly, in embodiments of the disclosure, discrete cross track patterned breaks are created in granular HAMR media to define track pitch of the HAMR system. In such embodiments, if a thermal spot created by the NFT is wider than the granular tracks, peripheral portions of the thermal spot will fall on the patterned breaks, which may be formed of a material that prevents adjacent track interference (ATI) under such conditions. Prior to providing additional details regarding the different embodiments, a description illustrative operating environments is provided below.

Figure 1:
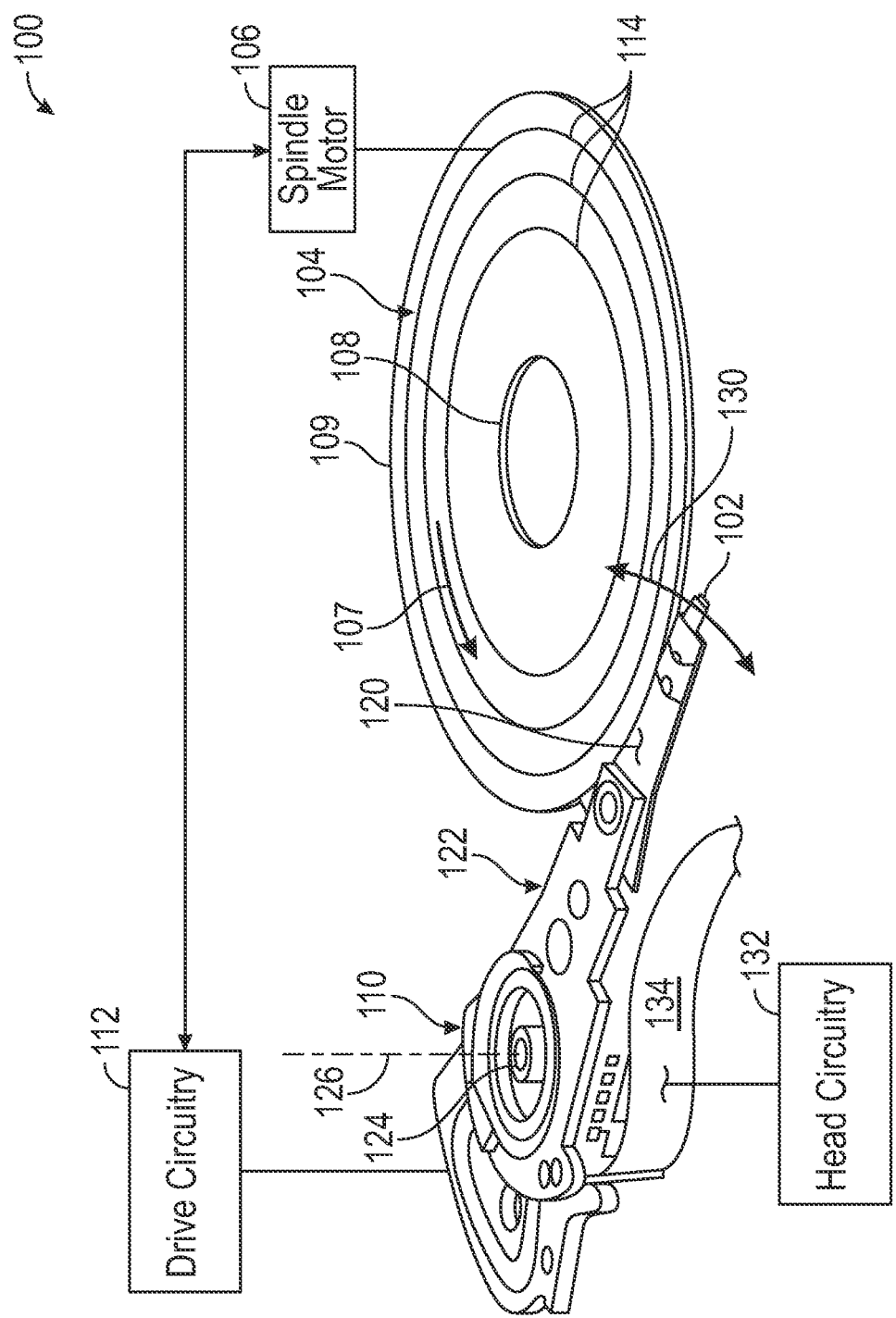
FIG. 1 is a schematic illustration of a data storage device including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same or like reference numerals are sometimes used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device 100 including a data storage medium 104 and a head 102 for reading data from and/or writing data to the data storage medium 104. Data storage device 100 may be characterized as a hard disc drive (HDD). In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107, and an actuator mechanism 110 positions the head 102 relative to data tracks (e.g., discrete data tracks) 114 on the rotating medium 104 between an inner diameter (ID) 108 and an outer diameter (OD) 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110, for example through a swage connection. Although FIG. 1 illustrates a single load beam 120 coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Drive circuitry 112 and head circuitry 132 are collectively referred to herein as control circuitry, which is discussed below in connection with FIG. 2A. In embodiments of the disclosure, data storage device 100 employs EAMR (e.g., HAMR). Details regarding elements of a head such as 102 and a data storage medium such as 104 in a HAMR system are provided below in connection with FIG. 2A.

Figure 2A:
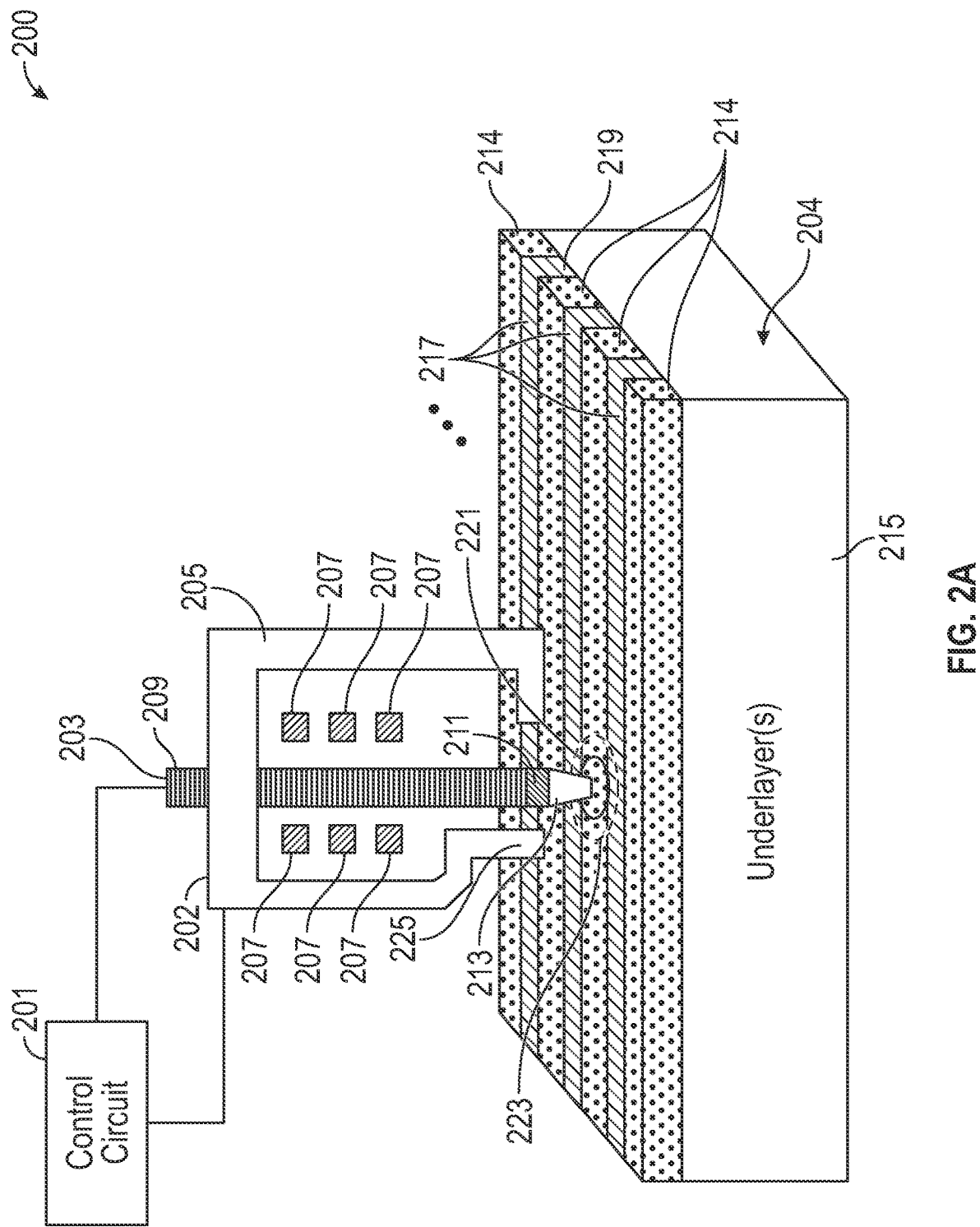
FIG. 2A is a view of a write head, a laser source, and a discrete track magnetic recording (DTMR) disc inside an energy-assisted magnetic recording drive in accordance with an embodiment of the disclosure.

FIG. 2A is a view of a write head 202, a laser source 203, and a DTMR disc 204 inside an EAMR drive 200 according to an embodiment of the disclosure. The write head 202 elements shown in FIG. 2A are illustratively included in a recording head such as recording head 102 in FIG. 1. DTMR disc 204 is illustratively a data storage medium such as medium 104 in FIG. 1. The EAMR drive 200 may be a HAMR drive. HAMR may also sometimes be referred to as thermally assisted magnetic recording (TAMR) or optically assisted magnetic recording (OAMR). The write head 202 may include a writer yoke 205 and writer coils 207. The write head 202 may be similar to conventional HAMR write heads. The components of the laser source 203 may include a waveguide 209 and a near-field transducer (NFT) 211. Techniques in generating a laser beam 213 and focusing the laser beam 213 with NFT 211 are known in the art, and thus, are not described in particular detail. Write head 202, laser source 203, and components such as an actuator mechanism (not shown in FIG. 2A) and a suspension assembly (not shown in FIG. 2A) for supporting the write head 202 may be coupled to control circuitry 201, which may include preamplifier circuitry, servo circuitry, etc., which are not separately shown.

The disc 204 includes spaced-apart discrete data storage tracks 214 supported by one or more underlayers 215, which may include a bottom-most substrate (not separately shown) and one or more intermediate layers (not separately shown). In some embodiments, recessed areas 217 between the discrete data storage tracks 214 include magnetic flux sinking material and/or plasmonic material 219. In the embodiment shown in FIG. 2A, the recessed areas 217 extend through the entire recording layer formed by discrete data storage tracks 214. In certain other embodiments, the recessed areas 217 may extend beyond the recording layer, and into a portion of underlayer(s) 215. In one embodiment, the recessed areas 217 may extend down to a soft underlayer (not separately shown), which may be an intermediate layer of underlayer(s) 215. In general, the recessed areas 217 may extend to any depth for suitable magnetic flux/plasmon sinking.

In EAMR (e.g., HAMR), the recording medium such as 204 is locally heated to decrease the coercivity of the magnetic material during write operations. The local area is then rapidly cooled to retain the written information. This allows for conventional magnetic write heads to be used with high coercivity magnetic materials.

Figure 2B:
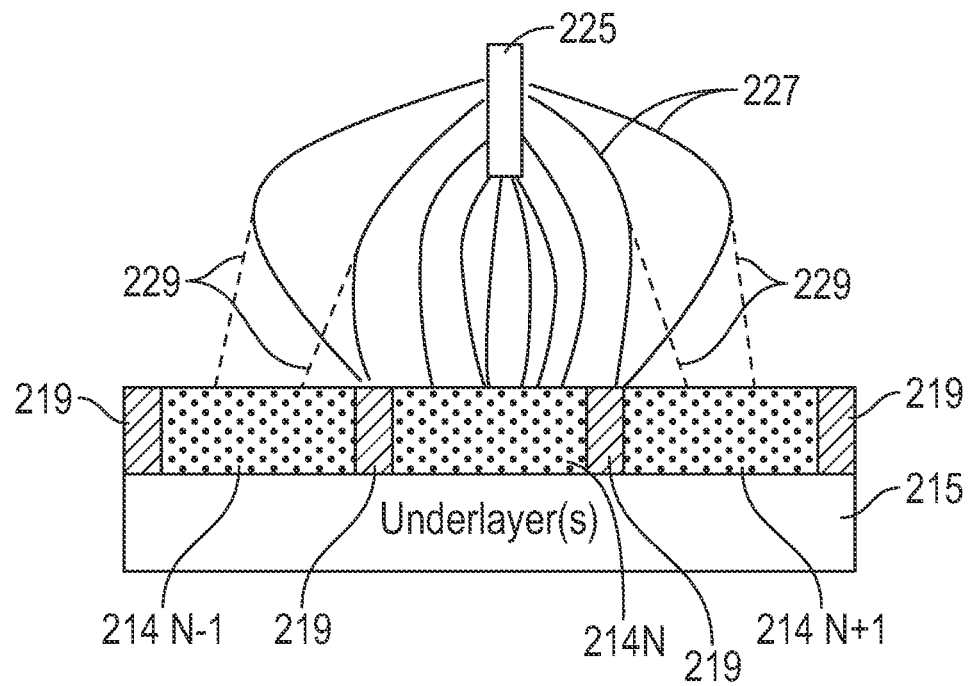
FIG. 2B is a diagrammatic illustration of main write pole of the write head of FIG. 2A and a cross sectional view of a portion of a DTMR disc in a cross-track direction.

In the embodiment of FIG. 2A, the laser source 203 produces a laser spot 221 that may be substantially centered on a data storage track 214 of interest, but may have edges that are on material 219 adjacent to the data storage track 214 of interest. Also, a resulting thermal spot 223 may be wider than the laser spot 221. As indicated above, employing, for example, a magnetic flux sinking material 219 mitigates or eliminates ATI when laser spot 221 and the resulting thermal spot 223 may possibly cause an increase in temperature of portions of adjacent tracks that are in close proximity to spots 221 and 223. FIG. 2B illustrates how ATI may be reduced by employing magnetic flux sinking material 219.

FIG. 2B is a diagrammatic illustration of main write pole 225 of write head 202 (of FIG. 2A) and a cross sectional view of a portion of disc 204 in a cross-track direction. As can be seen in FIG. 2B, magnetic flux (shown by flux lines 227) emanates from main write pole 225 such that a portion of the magnetic flux 227 is over tracks 214N−1 and 214N+1 that are adjacent to track 214N, which is the track of interest. In the absence of a material on either side of track 214N that enables flux sinking, ATI due to flux shown by dashed lines 229 would occur. However, the inclusion of the magnetic flux sinking material 219 causes the flux to be drawn into the material 219, thereby preventing ATI.

Figure 2C:
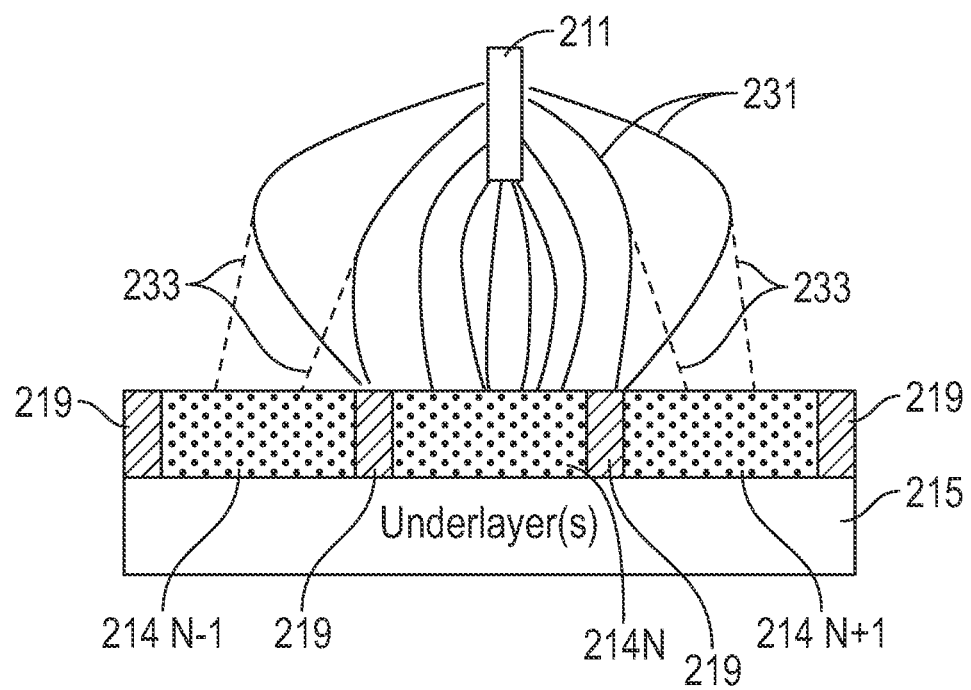
FIG. 2C is a diagrammatic illustration of a plasmon generator and a cross sectional view of a portion of a DTMR disc in a cross-track direction.

As indicated above, in some embodiments, material 219 may be a plasmonic material instead of a flux sinking material. In such embodiments, plasmons generated by a plasmon generator (e.g., NFT 211) may be prevented from falling on adjacent tracks by employing plasmonic material 219, which sinks plasmons generated by plasmon generator 211 shown in FIG. 2C. As can be seen in FIG. 2C plasmons (shown by lines 231) emanate from plasmon generator 211 such that a portion of the plasmons 231 are over tracks 214N−-1 and 214N+1 that are adjacent to track 214N, which is the track of interest. In the absence of a plasmonic material on either side of track 214N that sinks plasmons, heating of tracks 214N−1 and 214N+1 would occur by plasmons shown by dashed lines 233, making tracks 214N-1 and 214N+1 more writable, and therefore increasing the possibility of ATI. However, the inclusion of the plasmonic material 219 causes the plasmons directed to tracks 214N−1 and 214N+1 to be drawn into the material 219, thereby ultimately preventing ATI.

Non-limiting examples of magnetic materials that may be used to form tracks 219 are included in Table 1 below.

Thereafter, Table 2 provides non-limiting examples of magnetic flux sinking materials. Table 3 provides some examples of plasmonic materials that may be utilized for NFT 211 and also be utilized as material 219. Table 4 provides a larger list of non-limiting examples of plasmonic materials.

TABLE 1

| Type | Material | Magnetic anisotropy ($K_u$) ($10^7$ erg/cm$^3$) | Saturation Magnetization ($M_s$) (emu/cm$^3$) | Anisotropy Field ($H_k$) (kOe) | Curie Temperature ($T_c$) (K.) |
|---|---|---|---|---|---|
| Co Alloy | $CoCr_{20}Pt_{15}$ | 0.3 | 330 | 18.2 | 500 |
| | $Co_3Pt$ ($L1_2$) | 2 | 1100 | 36.4 | 750 |
| | $(CoCr)_3Pt$ | 1 | 800 | 25.0 | 1200 |
| | $CoPt_3$ | 0.5 | 300 | 33.3 | 600 |
| Multi-layer $L1_0$ | $Co_2Pt_9$ | 1 | 360 | 55.6 | 500 |
| | $Co_2Pd_9$ | 0.6 | 360 | 33.3 | 500 |
| | FePd | 1.8 | 1100 | 32.7 | 760 |
| | FePt | 7 | 1140 | 120 | 750 |
| | CoPt | 4.9 | 800 | 122.5 | 840 |
| | MnAl | 1.7 | 1.7 | 69 | 650 |
| Rare Earth | $SmCo5$ | 20 | 910 | 439.6 | 1000 |
| | $Fe_{14}Nd_2B$ | 4.6 | 1270 | 73 | 585 |

TABLE 2

| Type | Material | Permeability | $T_c$ (K.) |
|---|---|---|---|
| Permalloy | $Ni_{80}Fe_{20}$ | 8000 | 875 |
| Purified Iron | Fe | 10000 | 1043 |
| 4-79 Permalloy | $Mo_4Ni_{79}Fe_{17}$ | 20000 | 733 |
| Superalloy | $Mo_5Ni_{79}Fe_{16}$ | 100000 | 673 |
| 1040 Alloy | $Mo_3Cu_{14}Ni_{72}Fe_{11}$ | 40000 | 563 |
| Sendust | $Al_5Si_{10}Fe_{85}$ | 30000 | 773 |

TABLE 3

| NFT Material | QLSP (Quality Factor Localized Surface Plasmon) |
|---|---|
| Au | 33.99 |
| Ag | 97.43 |
| Cu | 10.0 |
| Al | 13.58 | magnetic track material is selected for use as material 219 between the tracks 214. This selection approach may be used because a level of heat to be applied to the magnetic track material may be selected such that it heats the magnetic track material to approximately its Curie temperature. This improves the ability to write to the track, but a magnetic moment of any magnetic material at its Curie temperature is zero. At zero magnetic moment, the magnetic flux sinking capability of the material is reduced, and therefore heating of the magnetic flux sinking material adjacent to the track to its Curie temperature may be avoided by utilizing a magnetic flux sinking material that has a higher Curie temperature than the magnetic track material. Plasmonic materials that have high QLSP values provide high plasmon sinking. However, certain materials that have high QLSP values (e.g., Ag) may also easily corrode, thereby making those materials unsuitable for use as a plasmon sinking material in a data storage medium. A material such as Au is more suitable than Ag because it has a relatively high QLSP value, and is also corrosion resistant. In some embodiments, a suitable alloy of multiple elements may be employed as the plasmonic material.

Referring back to FIG. 2A, data storage discs such as DTMR disc 204 in EAMR drive 200 may include servo wedges or sectors embedded inside gaps in the data tracks 214. The servo wedges or sectors include position information that is read by a reader of a recording head that may also include a write head such as 202, and that information is utilized by servo control circuitry (e.g., within control circuitry 201) for positioning the recording head over the track. Employing a servo system for positioning a head is known, and therefore no additional details regarding servo positioning are provided herein. Servo wedges may be configured differently in different embodiments. Examples of different servo configurations are provided below in connection with FIGS. 2D and 2E.

Figure 2D:
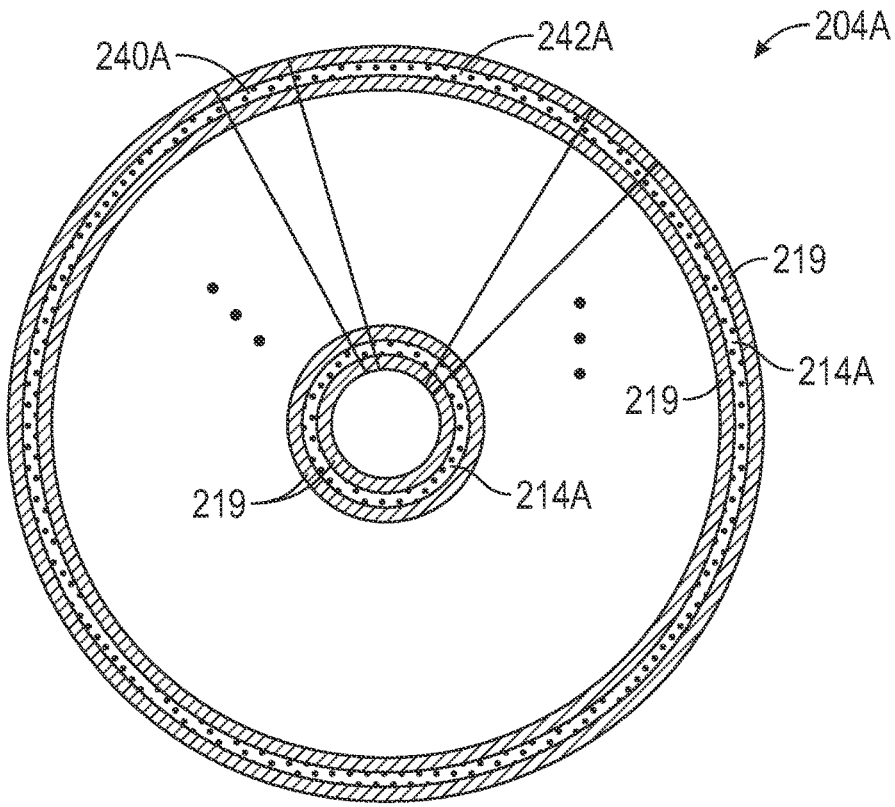
FIG. 2D is a top view of a DTMR disc in which both servo wedges and data wedges are included within discrete tracks in accordance with one embodiment.

FIG. 2D is a top view of a DTMR disc 204A with a first servo wedge arrangement in accordance with one embodiment. In this embodiment, the patterning of discrete tracks 214A is continuous or unbroken, and both servo wedges or sectors 240A and data wedges or sectors 242A are included within discrete tracks 214A. Here, a simple decrease in signal amplitude when reading servo wedges or sectors

TABLE 4

| Li | Be | | Element | *wmax is at the limit of the available data | | | | | | | B | C | | Max Qlsp Key |
|---|---|---|---|---|---|---|---|---|---|---|---|---|---|---|
| 0.14* | 0.20 | | Frequency of | # low requency data not included | | | | | | | | | | 0.00-2.99 |
| 28.82 | 3.58 | | Max QLSP | | | | | | | | | | | 3.00-3.99 |
| Na | Mg | | Maximum | | | | | | | | Al | Si | | 4.00-6.99 |
| 1.44 | 4.00 | | QLSP | | | | | | | | 11.00 | | | 7.00-9.99 |
| 35.09 | 9.94 | | | | | | | | | | 13.58 | | | 10+ |
| K | Ca | Sc | Ti | V | Cr | Mn | Fe | Co | Ni | Cu | Zn | Ga | Ge | As | Se |
| 1.05 | 0.65* | 0.3* | 0.20 | 0.36 | 0.30 | 0.07* | 0.10* | 0.10* | 0.15 | 1.75 | 3.60# | 8.30 | | | |
| 40.68 | 3.63 | 1.02 | 2.58 | 4.27 | 2.16 | 1.16 | 2.48 | 2.69 | 2.71 | 10.09 | 3.59 | 3.41 | | | |
| Rb | Sr | Y | Zr | Nb | Mo | Tc | Ru | Rh | Pd | Ag | Cd | In | Sn | Sb | Te |
| 0.81 | 0.36* | 1.48* | 3.00 | 0.55 | 0.38 | | 0.10* | 0.30 | 0.10* | 1.14 | 0.65# | 5.10 | 2.25 | 3.50 | |
| 21.90 | 2.85 | 1.41 | 1.16 | 3.39 | 5.38 | | 2.03 | 2.10 | 6.52 | 97.43 | 3.63 | 4.60 | 3.50 | 1.33 | |
| Cs | Ba | Lan | Hf | Ta | W | Re | Os | Ir | Pt | Au | Hg | Tl | Li | Bi | Po |
| 0.51* | 1.91 | | 0.52* | 0.58 | 0.30 | 0.10* | 0.10* | 0.40 | 0.35 | 1.40 | 4.20 | 3.20 | 5.95 | 3.50 | |
| 11.20 | 0.91 | | 0.79 | 5.25 | 4.96 | 4.99 | 6.12 | 2.55 | 1.96 | 33.99 | 2.20 | 2.71 | 3.07 | 1.15 | |

In Table 4 above, frequencies are in electron volts (eV).

Various criteria may be taken into consideration when selecting a magnetic flux sinking material or a plasmonic material. For example, in some embodiments, a suitable magnetic material for tracks 214 is selected, and then a flux sinking material having a higher Curie temperature than the 240A may be utilized to indicate that the recording head is drifting off-track such that part of its area is over material 219.

Figure 2E:
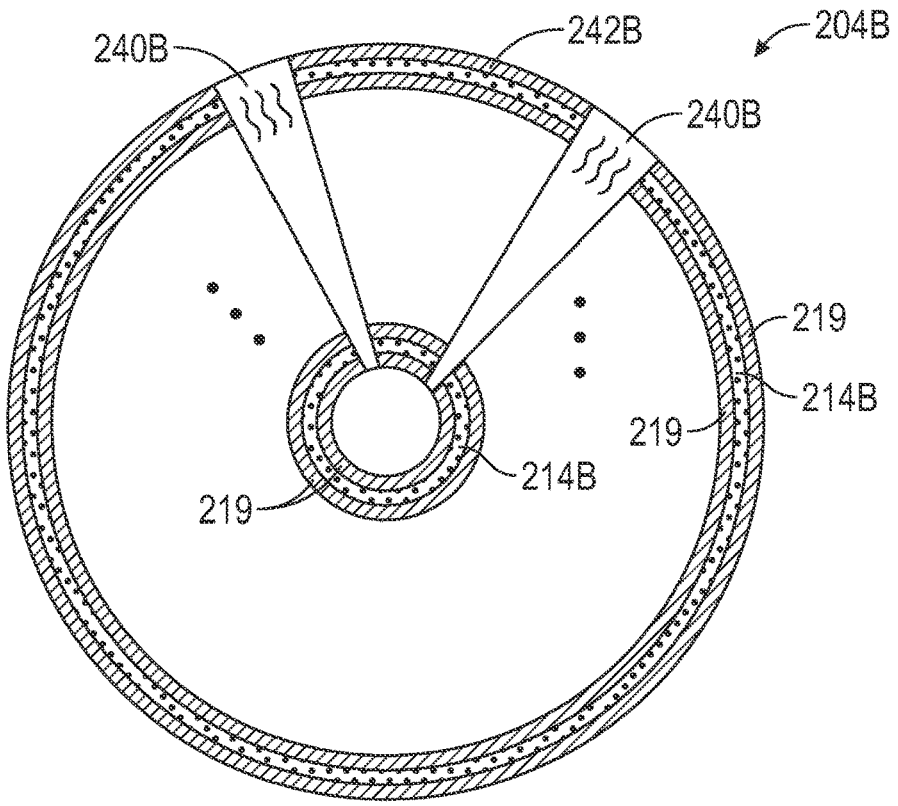
FIG. 2E is a top view of a DTMR disc that includes broken DTMR tracks with the broken track portions including data wedges, and spaces between the broken track portions including servo wedges in accordance with one embodiment.

FIG. 2E is a top view of a DTMR disc 204B with a second servo wedge arrangement in accordance with one embodiment. This embodiment includes broken DTMR tracks 214B with the broken discrete track portions including data wedges or sectors 242B, and spaces between the broken discrete track portions including servo wedges 240B.

In different embodiments, the spaced-apart discrete tracks 214 may have the same or different track pitches. Some example embodiments with various track pitches are described below in connection with FIGS. 3A-3E.

FIG. 3A is a top view of a DTMR disc portion 304A in accordance with one embodiment. Here, a track pitch 305, which is a width of a DTMR track 314A between flux sinking or plasmonic material 319 in a cross-track direction 306, is selected to accommodate one magnetically defined track. In this embodiment, random track 314A writes may be carried out with conventional magnetic recording (CMR) or banded writes may be carried out with shingled magnetic recording (SMR). Also, due to the ATI-reducing properties of material 319, the laser current may be increased to improve a signal-to-noise ratio (SNR).

FIG. 3B is a top view of a DTMR disc portion 304B in accordance with one embodiment. Here, a track pitch of each DTMR track 314B is large enough to accommodate two magnetically defined tracks in regions shown as zone 1 and zone 2. It should be noted that, since there is no physical separation between zone 1 and zone 2 (e.g., no physical separation by a material such as 319), both zones 1 and 2 may also be used as one magnetically defined track by, for example, increasing a laser spot size. Thus, in the embodiment of FIG. 3B, a data rate may be changed simply by altering the number of zones independently of the physical configuration of the DTMR track 314B.

In FIG. 3B, the top-most track is considered to be the closest to the disc ID. Therefore, direction 307 indicates movement away from the ID and towards the OD, and direction 309 indicates movement towards the ID and away from the OD. In some embodiments, zone 1 and zone 2 of each track 314B may be written using SMR. In certain embodiments, SMR may be carried out by writing zone 1 and zone 2 of each successive DTMR track 314B in a same direction. For example, zone 1 of the top-most track 314B is written first followed by zone 2 of that track 314B, etc., with the successive writes moving in the direction 307. Alternatively, zone 2 of the bottom-most track 314B is written first followed by zone 1 of that track 314B, etc., with the successive writes moving in the direction 309. In other embodiments, since ATI in SMR is only in one direction, zones 1 and 2 may be written in opposite directions to reduce ATI. For example, zone 1 of each track 314B may be written beginning from the top and moving in direction 307 to the bottom. Thereafter, zone 2 of each track 314B may written beginning from the bottom and moving in direction 309 to the top. It should be noted that zones of multiple tracks 314B may be written simultaneously using, for example, multiple recording heads mounted on different actuators. In some embodiments, random writes to DTMR tracks 314B may be enabled. In other embodiments, write operations may be limited to shingled-only writes with no random updates. In such embodiments, rewrites have to be to an entire band. Also, writing techniques of different embodiments may be combined in a hybrid embodiment.

FIG. 3C is a top view of a DTMR disc portion 304C in accordance with one embodiment. Here, a track pitch of each DTMR track 314C is large enough to accommodate three magnetically defined tracks in regions shown as zone 1, zone 2 and zone 3. Since there is no physical separation between zone 1, zone 2 and zone 3 (e.g., no physical separation by a material such as 319), zones 1, 2 and 3 may also be used for less than 3 (e.g., 2) magnetically defined tracks.

In some embodiments, zones 1, 2 and 3 of FIG. 3C may be utilized for interlaced magnetic recording (IMR). In such embodiments, zone 1 of each DTMR track 314C is written before zones 2 and 3 are written. If an update of zone 1 is desired, zones 2 and 3 are read before updating zone 1. Upon completion of the update of zone 1, the original data read from zones 2 and 3 is rewritten to those zones. Since an update to zone 1 triggers reads and rewrites to zones 2 and 3, less-frequently-updated data (or cold data) is stored in zone 1. In some embodiments, zones 1, 2 and 3 may be utilized for SMR. SMR may be carried out in a same direction (e.g., all writes carried out in one of directions 407 or 409), or shingle directions may be flipped when writing zones 2 and 3. For example, zone 2 of each track 314C may be written beginning from the top and moving in direction 407 to the bottom. Thereafter, zone 3 of each track 314C may written beginning from the bottom and moving in direction 409 to the top.

FIG. 3D is a top view of a DTMR disc portion 304D in accordance with one embodiment. DTMR disc portion 304D includes DTMR tracks 314D that are physically or structurally similar to DTMR tracks 314A of FIG. 3A. However, DTMR tracks 314D are employed for IMR in which bottom tracks are written before writing top tracks. As noted above, in IMR, top tracks are rewritten when data of the bottom track is updated.

FIG. 3E is a top view of a DTMR disc portion 304E in accordance with one embodiment. DTMR disc portion 304E includes DTMR tracks 314E in which each bottom track has a wider track pitch than each top track. In this embodiment, a larger laser spot may be utilized when writing a bottom track. Also, two or more NFTs and writers along with two or more readers in a same head or in separate heads may be employed for top and bottom tracks. Here, some of the readers and writers may be designed for interaction with the wider bottom tracks, and other readers and writers may be designed for interaction with the top tracks.

In the above-described embodiments, flux sinking material and plasmonic material are provided as examples of materials that may be utilized between discrete tracks to reduce ATI. However, any suitable materials that reduce ATI may be employed in different embodiments. Also, in the different DTMR embodiments described above, a recording head utilized to read the discrete tracks may include any suitable number of readers and/or writers.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage medium comprising:
a substrate;
a plurality of spaced-apart discrete data storage tracks supported by the substrate; and
magnetic flux sinking or plasmonic material between the discrete data storage tracks and over the substrate,
wherein the magnetic flux sinking or plasmonic material is a continuous layer connecting two adjacent discrete data storage tracks in a cross-track direction, and wherein an upper surface of the continuous layer of the magnetic flux sinking or plasmonic material is coplanar with upper surfaces of the two adjacent discrete data storage tracks.

2. The data storage medium of claim 1 and wherein at least some of the plurality of spaced-apart discrete data storage tracks have differing track pitches.

3. The data storage medium of claim 1 and wherein at least one discrete data storage track of the plurality of spaced-apart discrete data storage tracks comprises a track pitch that accommodates a single magnetically defined data storage track.

4. The data storage medium of claim 1 and wherein at least one discrete data storage track of the plurality of spaced-apart discrete data storage tracks comprises a track pitch that accommodates multiple magnetically defined data storage tracks.

5. The data storage medium of claim 4 and wherein the multiple magnetically defined data storage tracks are shingled magnetic recording (SMR) tracks.

6. The data storage medium of claim 4 and wherein the multiple magnetically defined data storage tracks are interlaced magnetic recording (IMR) tracks.

7. The data storage medium of claim 1 and wherein:

a first discrete data storage track of the plurality of spaced-apart discrete data storage tracks comprises a first track pitch;
a second discrete data storage track of the plurality of spaced-apart discrete data storage tracks located on a first side of the first discrete data storage track comprises a second track pitch; and
a third discrete data storage track of the plurality of spaced-apart discrete data storage tracks located on a second side of the first discrete data storage track comprises the second track pitch;
wherein the second track pitch is less than the first track pitch.

8. The data storage medium of claim 7 and wherein the first discrete data storage track is a bottom IMR track, and the second and third discrete data storage tracks are top IMR tracks.

9. A data storage medium comprising:
a substrate;
a plurality of spaced-apart discrete data storage tracks supported by the substrate, the plurality of spaced-apart discrete data storage tracks comprising a first discrete data storage track having a first track pitch, and a second discrete data storage track having a second track pitch that is greater than the first track pitch; and
a magnetic flux sinking material between the discrete data storage tracks and over the substrate.

10. The data storage medium of claim 9 and wherein the first discrete data storage track having the first track pitch accommodates a single magnetically defined data storage track.

11. The data storage medium of claim 9 and wherein the second discrete data storage track having the second track pitch accommodates multiple magnetically defined data storage tracks.

12. The data storage medium of claim 9 and wherein the plurality of spaced-apart discrete data storage tracks further comprises a third discrete data storage track having the first track pitch, and wherein the first discrete data storage track is on a first side of the second discrete data storage track, and wherein the third discrete data storage track is on a second side of the second discrete data storage track.

13. The data storage medium of claim 12 and wherein the second discrete data storage track is a bottom interlaced magnetic recording (IMR) track, and the first and third discrete data storage tracks are top IMR tracks.

14. A data storage drive comprising:
a data storage medium comprising:
a substrate; and
a plurality of spaced-apart discrete data storage tracks supported by the substrate;
at least one recording head configured to interact with the data storage medium; and
control circuitry communicatively coupled to the at least one recording head, the control circuitry configured to direct the at least one recording head to write multiple zones of data positioned side by side in a cross-track direction within a discrete data storage track of the plurality of spaced-apart discrete data storage tracks, with each of the multiple zones of data forming a different magnetically defined data storage track within the discrete data storage track.

15. The data storage drive of claim 14 and wherein the control circuitry is configured to direct the at least one recording head to write the multiple zones of data within the discrete data storage track of the plurality of spaced-apart discrete data storage tracks using shingled magnetic recording (SMR).

16. The data storage drive of claim 14 and wherein the control circuitry is configured to direct the at least one recording head to write the multiple zones of data within the discrete data storage track of the plurality of spaced-apart discrete data storage tracks using interlaced magnetic recording (IMR).

17. The data storage drive of claim 14 and wherein at least some of the plurality of spaced-apart discrete data storage tracks comprise data wedges and servo wedges.

18. The data storage drive of claim 14 and wherein at least some of the plurality of spaced-apart discrete data storage tracks are broken discrete data storage tracks with broken track portions comprising data wedges, and wherein spaces between the broken track portions comprise servo wedges.

19. The data storage drive of claim 14 and further comprising a magnetic flux sinking or plasmonic material between the discrete data storage tracks and over the substrate.

* * * * *